(12) United States Patent
Weiss et al.

(10) Patent No.: US 7,692,664 B2
(45) Date of Patent: Apr. 6, 2010

(54) CLOSED FORM METHOD AND SYSTEM FOR MATTING A FOREGROUND OBJECT IN AN IMAGE HAVING A BACKGROUND

(75) Inventors: Yair Weiss, Jerusalem (IL); Daniel Lischinski, Jerusalem (IL); Anat Levin, Jerusalem (IL)

(73) Assignee: Yissum Research Development Co., Jerusalem (IL)

( * ) Notice: Subject to any disclaimer, the term of this patent is extended or adjusted under 35 U.S.C. 154(b) by 0 days.

(21) Appl. No.: 12/497,800

(22) Filed: Jul. 6, 2009

(65) Prior Publication Data

US 2009/0278859 A1    Nov. 12, 2009

Related U.S. Application Data

(63) Continuation of application No. 11/487,482, filed on Jul. 17, 2006.

(60) Provisional application No. 60/699,503, filed on Jul. 15, 2005, provisional application No. 60/714,265, filed on Sep. 7, 2005.

(51) Int. Cl.
*G09G 5/02* (2006.01)

(52) U.S. Cl. .................. 345/592; 345/589; 345/629; 382/173

(58) Field of Classification Search .................. 345/592
See application file for complete search history.

(56) References Cited

U.S. PATENT DOCUMENTS

| 6,134,345 | A | 10/2000 | Berman | |
|---|---|---|---|---|
| 7,397,948 | B1* | 7/2008 | Cohen et al. | 382/167 |
| 2005/0163375 | A1* | 7/2005 | Grady | 382/180 |
| 2005/0226506 | A1* | 10/2005 | Aharon et al. | 382/180 |
| 2006/0104513 | A1* | 5/2006 | Aharon et al. | 382/180 |

OTHER PUBLICATIONS

Apostoloff, N. et al, "Bayesian Video Matting Using Learnt Image Priors," Proc. CVPR, 2004, pp. 1-8.
Chuang, Y. et al., "A Bayesian Approach to Digital Matting," Proc. CVPR, 2001, pp. 1-7.
Chuang, Y. et al., "Video Matting of Complex Scenes" ACM Trns. Graph., 2002, pp. 243-248, vol. 21 (3).
Levin, A. et al., "A Closed Form Solution to Natural Image Matting," Hebrew University Technical Report, 2006, pp. 1-15.

(Continued)

*Primary Examiner*—Xiao M Wu
*Assistant Examiner*—Charles Tseng
(74) *Attorney, Agent, or Firm*—Browdy & Neimark, PLLC

(57) ABSTRACT

In a method and system for matting a foreground object F having an opacity α constrained by associating a characteristic with selected pixels in an image having a background B, weights are determined for all edges of neighboring pixels for the image and used to build a Laplacian matrix L. The equation α is solved where $\alpha = \arg\min \alpha^T L \alpha$ s.t. $\alpha_i = s_i$, $\forall i \in S$, S is the group of selected pixels, and $s_i$ is the value indicated by the associated characteristic. The equation $I_i = \alpha_i F_i + (1-\alpha_i) B_i$ is solved for F and B with additional smoothness assumptions on F and B; after which the foreground object F may be composited on a selected background B' that may be the original background B or may be a different background, thus allowing foreground features to be extracted from the original image and copied to a different background.

18 Claims, 9 Drawing Sheets

OTHER PUBLICATIONS

Levin, A. et al, "Colorization Using Optimization," ACM Transactions on Graphics, 2004, pp. 1-6.
Li, Y. et al., "Lazy Snapping," ACM Trans. Graph., 2004, pp. 303-308, vol. 23 (3).
Omer, I., et al., "Color Lines: Image Specific Representation," Proc. CVPR, 2004, pp. 1-8.
Rother, C., et al., "'Grab Cut'—Interactive Foreground Extraction Using Iterated Graph Cuts," ACM Trans Graph., 2004, pp. 309-314, vol. 23 (3).
Ruzon, M. A., et al., "Alpha Estimation in Natural Images," Proc. CVPR, 2000, pp. 18-25, vol. 1.
Sun, J., et al., "Poisson Matting," ACM Trans. Graph., 2004, pp. 315-321, vol. 23 (3).
Wang, J., et al., "An Interactive Optimization Approach for Unified Image Segmentation and Matting," Proc. IEEE Intl. Conf. on Computer Vision, 2005.
Zelnik-Manor, L. et al., "Self-Tuning Spectral Clustering," Advances in Neural information Processing Systems 17, 2005.
Zomet, A., et al., "Multi-Sensor Super-Resolution," Proceedings of the IEEE Workshop on applications of Computer Vision, 2002, pp. 1-5.
Grady, L., et al., "Random Walks For Interactive Alpha-Matting," Proc. VIIP05, 2005, pp. 423-429.
Boykov, Y.Y., et al., "Interactive Graph Cuts for Optimal Boundary & Region Segmentation of Objects in n-d Images," Proc. ICCV, 2001, pp. 105-112, vol. 1.
Shi, J., et al., "Normalized Cuts and Image Segmentation," Proc. CVPR, 1997, pp. 731-737.
Jianbo Shi and Jitendra Malik, Normalized Cuts and Image Segmentation, IEEE Transactions on Pattern Analysis and Machine Intelligence, vol. 22, No. 8, Aug. 2000.*
Leo Grady and Gareth Funka-Lea, Multi-Label Image Segmentation for Medical Applications Based on Graph-Theoretic Electric Potentials, Lecture Notes in Computer Science, vol. 3117/2004, Springer Berlin / Heidelberg, Oct. 4, 2004.*

* cited by examiner

CLOSED FORM METHOD AND SYSTEM FOR MATTING A FOREGROUND OBJECT IN AN IMAGE HAVING A BACKGROUND

RELATED APPLICATIONS

This application is a continuation of U.S. Ser. No. 11/487,482 filed Jul. 17, 2006 and claims benefit of provisional applications Ser. Nos. 60/699,503 filed Jul. 15, 2005 and 60/714,265 filed Sep. 7, 2005 all of whose contents are included herein by reference.

FIELD OF THE INVENTION

This invention relates to image matting.

REFERENCES

The description refers to the following prior art references, whose contents are incorporated herein by reference.

[1] N. E. Apostoloff and A. W. Fitzgibbon. "Bayesian video matting using learnt image priors" In Proc. CVPR, 2004.
[2] U.S. Pat. No. 6,134,345 A. Berman, P. Vlahos, and A. Dadourian. "Comprehensive method for removing from an image the background surrounding a selected object", 2000
[3] Y. Boykov and M. P. Jolly "Interactive graph cuts for optimal boundary & region segmentation of objects in n-d images" In Proc. ICCV, 2001.
[4] Y. Chuang, A. Agarwala, B. Curless, D. Salesin, and R. Szeliski "Video matting of complex scenes", ACM Trans. Graph., 21 (3):243-248, 2002.
[5] Y. Chuang, B. Curless, D. Salesin, and R. Szeliski "A Bayesian approach to digital matting" In Proc. CVPR, 2001.
[6] L. Grady, T. Schiwietz, S. Aharon, and R. Westermann "Random walks for interactive alpha-matting" In Proc. VIIP05.
[7] A. Levin, D. Lischinski, and Y. Weiss "Colorization using optimization" ACM Transactions on Graphics, 2004.
[8] A. Levin, D. Lischinski, and Y. Weiss "A closed form solution to natural image matting" Hebrew University Technical Report, 2006.
[9] Y. Li, J. Sun, C.-K. Tang, and H.-Y. Shum "Lazy snapping" ACM Trans. Graph., 23(3):303-308, 2004.
[10] I. Omer and M. Werman "Color lines: Image specific color representation" In Proc. CVPR 2004, June 2004.
[11] C. Rother, V. Kolmogorov, and A. Blake "'grabcut': interactive foreground extraction using iterated graph cuts" ACM Trans. Graph., 23(3):309-314, 2004.
[12] M. Ruzon and C. Tomasi "Alpha estimation in natural images" In Proc. CVPR, 2000.
[13] J. Shi and J. Malik "Normalized cuts and image segmentation" In Proc. CVPR, pages 731-737, 1997.
[14] J. Sun, J. Jia, C.-K. Tang, and H.-Y. Shum "Poisson matting" ACM Trans. Graph., 23(3):315-321, 2004.
[15] J. Wang and M. Cohen "An iterative optimization approach for unified image segmentation and matting" In Proc. IEEE Intl. Conf on Computer Vision, 2005.
[16] L. Zelnik-Manor and P. Perona "Self-tuning spectral clustering" In Advances in Neural Information Processing Systems 17. 2005.
[17] A. Zomet and S. Peleg "Multi-sensor super resolution" In Proceedings of the IEEE Workshop on Applications of Computer Vision, 2002.

BACKGROUND OF THE INVENTION

Interactive digital matting, the process of extracting a foreground object from an image based on limited user input, is an important task in image and video editing. From a computer vision perspective, this task is extremely challenging because it is massively ill-posed—at each pixel we must estimate the foreground and the background colors, as well as the foreground opacity ("alpha matte") from a single color measurement. Current approaches either restrict the estimation to a small part of the image, estimating foreground and background colors based on nearby pixels where they are known, or perform iterative nonlinear estimation by alternating foreground and background color estimation with alpha estimation.

Natural image matting and compositing is of central importance in image and video editing. The goal is to extract a foreground object, along with an opacity map (alpha matte) from a natural image, based on a small amount of guidance from the user. Thus, FIG. 1 shows how matting is used to extract a foreground object from an image shown in FIG. 1(a) and compositing it with a novel background shown in FIG. 1(e). Traditionally, this has been done using a trimap interface as shown in FIG. 1(b). As will be shown in the following description, the invention permits a high quality matte shown in FIG. 1(d) to be obtained with a sparse set of scribbles shown in FIG. 1(c).

What distinguishes matting and compositing from simple "cut and paste" operations on the image is the challenge of correctly handling "mixed pixels". These are pixels in the image whose color is a mixture of the foreground and background colors. Such pixels occur, for example, along object boundaries or in regions containing shadows and transparency. While mixed pixels may represent a small fraction of the image, human observers are remarkably sensitive to their appearance, and even small artifacts could cause the composite to look fake. Formally, image matting methods take as input an image I, which is assumed to be a composite of a foreground image F and a background image B. The color of the i-th pixel is assumed to be a linear combination of the corresponding foreground and background colors, $$I_i = \alpha_i F_i + (1 - \alpha_i) B_i \qquad (1)$$

where $\alpha_i$ is the pixel's foreground opacity. In natural image matting, all quantities on the right hand side of the compositing equation (1) are unknown. Thus, for a 3 channel color image, at each pixel there are 3 equations and 7 unknowns.

Obviously, this is a severely under-constrained problem, and user interaction is required to extract a good matte. Most recent methods expect the user to provide a trimap [1, 2, 4, 5, 12, 14] as a starting point; an example is shown in FIG. 2(e). The trimap is a rough (typically hand-drawn) segmentation of the image into three regions: foreground (shown in white), background (shown in black) and unknown (shown in gray). Given the trimap, these methods typically solve for F, B and α simultaneously. This is typically done by iterative nonlinear optimization, alternating the estimation of F and B with that of α. In practice, this means that for good results the unknown regions in the trimap must be as small as possible. As a consequence, trimap-based approaches typically experience difficulty handling images with a significant portion of mixed pixels or when the foreground object has many holes [15]. In such challenging cases a great deal of experience and user interaction may be necessary to construct a trimap that would yield a good matte. Another problem with the trimap interface is that the user cannot directly influence the matte in the most important part of the image: the mixed pixels. It would clearly be preferable to provide more direct control over these mixed regions.

The requirement of a hand-drawn segmentation becomes far more limiting when one considers image sequences. In these cases the trimap needs to be specified over key frames and interpolated between key frames.

While good results have been obtained by intelligent use of optical flow [4], the amount of interaction obviously grows quite rapidly with the number of frames.

Another problem with the trimap interface is that the user cannot directly influence the matte in the most important part of the image: the mixed pixels. When the matte exhibits noticeable artifacts in the mixed pixels, the user can refine the trimap and hope this improves the results in the mixed region.

As noted above, most existing methods for natural image matting require the input image to be accompanied by a trimap [1, 2, 4, 5, 12, 14], labeling each pixel as foreground, background, or unknown. The goal of the method is to solve the compositing equation (1) for the unknown pixels. This is typically done by exploiting some local regularity assumptions on F and B to predict their values for each pixel in the unknown region. In the Corel KnockOut algorithm [2], F and B are assumed to be smooth and the prediction is based on a weighted average of known foreground and background pixels (closer pixels receive higher weight). Some algorithms [5, 12] assume that the local foreground and background come from a relatively simple color distribution. Perhaps the most successful of these algorithms is the Bayesian matting algorithm [5], where a mixture of oriented Gaussians is used to learn the local distribution and then $\alpha$, F and B are estimated as the most probable ones given that distribution. Such methods work well when the color distributions of the foreground and the background do not overlap, and the unknown region in the trimap is small. As demonstrated in FIG. 2(b) a sparse set of constraints could lead to a completely erroneous matte.

The Bayesian matting approach has been extended to video in two recent papers. Chuang [4] use optical flow to warp the trimaps between keyframes and to dynamically estimate a background model. Apostoloff and Fitzgibbon [1] minimize a global, highly nonlinear cost function over $\alpha$, F and B for the entire sequence. Their cost function includes the mixture of Gaussians log likelihood for foreground and background along with a term biasing $\alpha$ towards 0 and 1, and a learnt spatiotemporal consistency prior on $\alpha$. The algorithm can either receive a trimap as input, or try to automatically determine a coarse trimap using background subtraction.

The Poisson matting method [14], also expects a trimap as part of its input, and computes the alpha matte in the mixed region by solving a Poisson equation with the matte gradient field and Dirichlet boundary conditions. In the global Poisson matting method the matte gradient field is approximated as $\nabla I/_{(F-B)}$ by taking the gradient of the compositing equation, and neglecting the gradients in F and B. The matte is then found by solving for a function whose gradients are as close as possible to the approximated matte gradient field. Whenever F and B are not sufficiently smooth inside the unknown region, the resulting matte might not be correct, and additional local manipulations may need to be applied interactively to the matte gradient field in order to obtain a satisfactory solution. This interactive refinement process is referred to as local Poisson matting.

Recently, several successful approaches for extracting a foreground object from its background have been proposed [3,9,11]. These approaches translate simple user-specified constraints (such as scribbles, or a bounding rectangle) into a min-cut problem. Solving the min-cut problem yields a hard binary segmentation, rather than a fractional alpha matte (FIG. 2(c)). The hard segmentation could be transformed into a trimap by erosion, but this could still miss some fine or fuzzy features (FIG. 2(d)). Although Rother [11] do perform border matting by fitting a parametric alpha profile in a narrow strip around the hard boundary, this is more akin to feathering than to full alpha matting, since wide fuzzy regions cannot be handled in this manner.

Both the colorization method of Levin [7] and the random walk alpha matting method of Grady [6] propagate scribbled constraints to the entire image by minimizing a quadratic cost function. Another scribble-based interface for interactive matting was recently proposed by Wang and Cohen [15]. Starting from a few scribbles indicating a small number of background and foreground pixels, they use belief propagation to iteratively estimate the unknowns at every pixel in the image. While this approach has produced some impressive results, it has the disadvantage of employing an expensive iterative non-linear optimization process, which might converge to different local minima.

Wang's iterative matte optimization attempts to determine for each pixel all of the unknown attributes (F, B and $\alpha$) and to reduce the uncertainty of these values. Initially, all user-marked pixels have uncertainty of 0 and their $\alpha$ and F or B colors are known. For all other pixels, the uncertainty is initialized to 1 and $\alpha$ is set to 0.5. The approach proceeds iteratively: in each iteration, pixels adjacent to ones with previously estimated parameters are considered and added to the estimated set. The process stops once there are no more unconsidered pixels left and the uncertainty cannot be reduced any further. Belief Propagation (BP) is used in each iteration. The optimization goal in each iteration is to minimize a cost function consisting of a data term and a smoothness term. The data term describes how well the estimated parameters fit the observed color at each pixel. The smoothness term is claimed to penalize "inconsistent alpha value changes between two neighbors", but in fact it just penalizes any strong change in alpha, because it only looks at the alpha gradient, ignoring the underlying image values. This is an iterative non-linear optimization process, so depending on the initial input scribbles it might converge to a wrong local minimum. Finally, the cost of this method is quite high: 15-20 minutes for a 640 by 480 image.

SUMMARY OF THE INVENTION

According to a first aspect of the invention there is provided a method for matting a foreground object F having an opacity $\alpha$ in an image having a background B, the respective opacity of selected pixels in the foreground object F and the background B being constrained by associating a characteristic with said pixels, the method comprising:

(a) determining weights for all edges of neighboring pixels for the image;
(b) build a Laplacian matrix L with the weights;
(c) solve the equation $\alpha$ where $\alpha$=arg min $\alpha^T L\alpha$ s.t.$\alpha_i$=$s_i$, $\forall i \in S$, S is the group of selected pixels, and $s_i$ is the value indicated by said characteristic;
(d) solve for F and B in the equation $I_i = \alpha_i F_i + (1-\alpha_i) B_i$ with additional smoothness assumptions on F and B; and
(e) compositing the foreground object F on a selected background B.

In accordance with a second aspect of the invention there is provided a system for matting a foreground object F having an opacity $\alpha$ in an image having a background B, the respective opacity of selected pixels in the foreground object F and the background B being constrained by associating a characteristic with said pixels, comprising: a graphics processing unit; and software loadable on the graphics processing unit, the software being operable to:

(a) determining weights for all edges of neighboring pixels for the image;
(b) build a Laplacian matrix L with the weights;
(c) solve the equation α where α=arg min $α^T Lα$ s.t.$α_i$=$s_i$, ∀i∈S, S is the group of selected pixels and $s_i$ is the value indicated by said characteristic;
(d) solve for F and B in the equation $I_i=α_iF_i+(1-α_i)B_i$ with additional smoothness assumptions on F and B; and
(e) compositing the foreground object F on a selected background B.

The invention provides a new closed-form solution for extracting the alpha matte from a natural image. We derive a cost function from local smoothness assumptions on foreground and background colors F and B, and show that in the resulting expression it is possible to analytically eliminate F and B, yielding a quadratic cost function in α. The alpha matte produced by our method is the global optimum of this cost function, which may be obtained by solving a sparse linear system. Since our approach computes α directly and without requiring reliable estimates for F and B, a surprisingly small amount of user input (such as a sparse set of scribbles) is often sufficient for extracting a high quality matte.

Furthermore, the closed-form formulation as provided in accordance with the invention enables one to understand and predict the properties of the solution by examining the eigenvectors of a sparse matrix, closely related to matrices used in spectral image segmentation algorithms. In addition to providing a solid theoretical basis for our approach, such analysis can provide useful hints to the user regarding where in the image scribbles should be placed.

In contrast to the Bayesian matting algorithm [5], while the invention also makes certain smoothness assumptions regarding F and B, it does not involve estimating the values of these functions until after the matte has been extracted.

Thus, rather than specifying a trimap, in accordance with the invention, the user scribbles constraints on the opacity of certain pixels. The constraints can be of the form "these pixels are foreground", "these pixels are background" or the user can give direct constraints on the mixed pixels. The algorithm then propagates these constraints to the full image sequence based on a simple cost function—that nearby pixels in space-time with similar colors should have a similar opacity. The invention shows how to minimize the cost using simple numerical linear algebra, and display high quality mattes from natural images and image sequences.

BRIEF DESCRIPTION OF THE DRAWINGS

In order to understand the invention and to see how it may be carried out in practice, an embodiment will now be described, by way of non-limiting example only, with reference to the accompanying drawings, in which.

DETAILED DESCRIPTION OF EMBODIMENTS

Derivation

Figure 1:
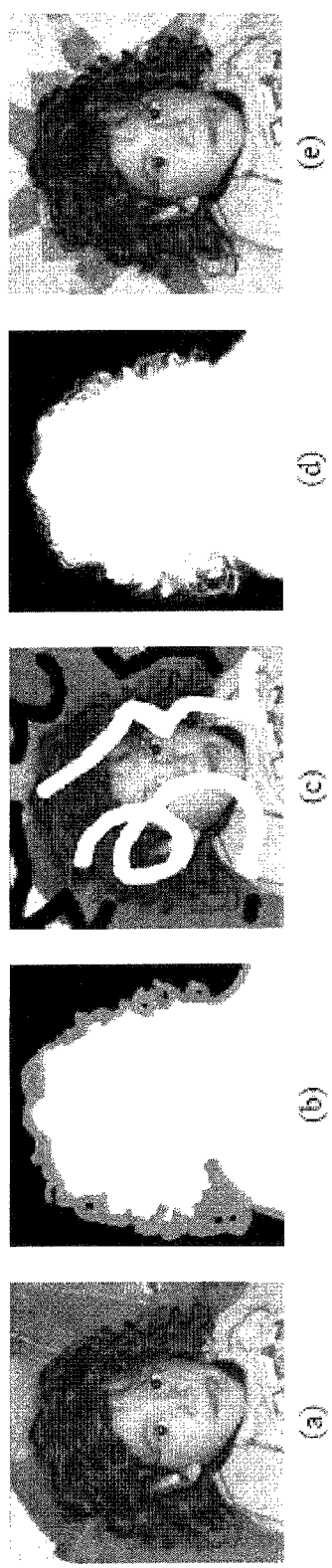
FIGS. 1(a) to 1(e) compare use of a trimap interface shown in FIG. 1(b) to extract a foreground object from an image shown in FIG. 1(a) and compositing it with a novel background shown in FIG. 1(e) with use of a sparse set of scribbles shown in FIG. 1(c) to achieve a high quality matte shown in FIG. 1(d)
Figure 2:
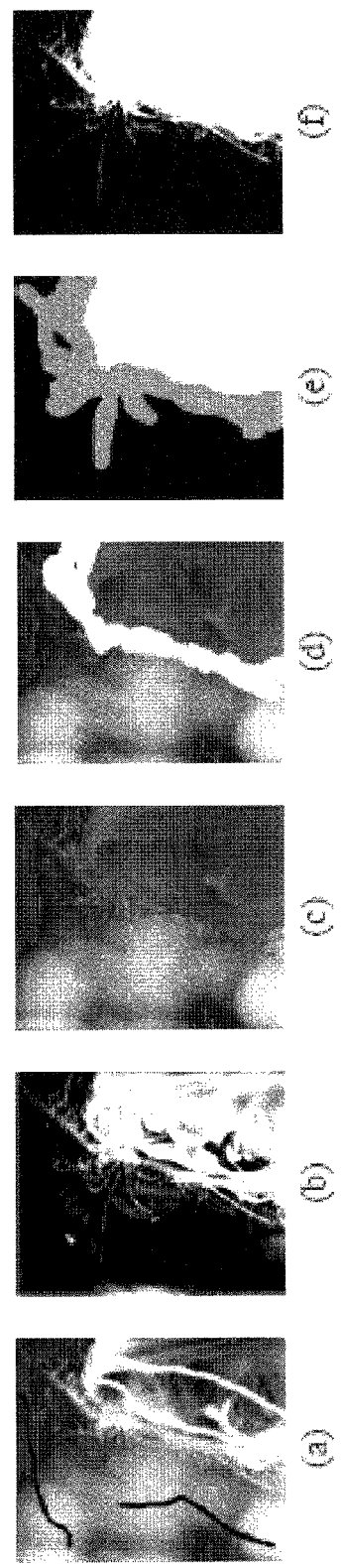
FIG. 2(a) shows pictorially an image with sparse constraints: white scribbles indicate foreground, black scribbles indicate background.
FIG. 2(b) shows a completely erroneous matte produced by applying Bayesian matting to the sparse input of FIG. 2(a)
FIG. 2(c) shows a hard segmentation produced using foreground extraction algorithms, such as [9,11]
FIG. 2(d) shows how fine features may be missed using an automatically generated trimap from a hard segmentation.
FIG. 2(e) show an accurate hand-drawn trimap that is required to produce a reasonable matte as shown in FIG. 2(f)

For clarity of exposition we begin by deriving a closed-form solution for alpha matting of grayscale images. This solution will then be extended to the case of color images.

As mentioned earlier, the matting problem is severely under-constrained. Therefore, some assumptions on the nature of F, B and/or α are needed. To derive our solution for the grayscale case we make the assumption that both F and B are approximately constant over a small window around each pixel. Note that assuming F and B are locally smooth does not mean that the input image I is locally smooth, since discontinuities in α can account for the discontinuities in I. This assumption, which will be somewhat relaxed later, allows us to rewrite (1) expressing α as a linear function of the image I:

$$\alpha_i \approx aI_i + b, \forall i \in w, \quad (2)$$

where $$a = \frac{1}{F-B}, b = -\frac{B}{F-B}$$

and w is a small image window. This linear relation is similar to the prior used in [17]. One object of the invention is to find α, a and b minimizing the cost function:

$$J(\alpha, a, b) = \sum_{j \in I} \sum_{i \in w_j} (a_j I_i + b_j - \alpha_i)^2 + \varepsilon a_j^2 \quad (3)$$

where $w_j$ is a small window around pixel j.

The cost function above includes a regularization term on α. One reason for adding this term is numerical stability. For example, if the image is constant in the j-th window, $a_j$ and $b_j$ cannot be uniquely determined without a prior probability. Also, minimizing the norm of α biases the solution towards smoother α mattes (since $a_j=0$ means that α is constant over the j-th window).

In our implementation, we typically use windows of 3×3 pixels. Since we place a window around each pixel, the windows $w_j$ in (3) overlap. It is this property that enables the propagation of information between neighboring pixels. The cost function is quadratic in α, a and b, with 3N unknowns for an image with N pixels. Fortunately, as we show below, a and b may be eliminated from (3), leaving us with a quadratic cost in only N unknowns: the alpha values of the pixels.

Theorem 1 Define J(α) as $$J(\alpha) = \min_{a,b} J(\alpha, a, b)$$

Then $$J(\alpha) = \alpha^T L \alpha, \quad (4)$$

where L is an N×M matrix, whose (i,j)-th entry is:

$$\sum_{k|(i,j) \in w_k} \left( \delta_{ij} - \frac{1}{|w_k|}\left(1 + \frac{1}{\frac{\varepsilon}{|w_k|}+\sigma_k^2}(I_i - \mu_k)(I_j - \mu_k)\right)\right) \quad (5)$$

Here $\delta_{ij}$ is the Kronecker delta, $\mu_k$ and $\sigma_k^2$ are the mean and variance of the intensities in the window $w_k$ around k and $|w_k|$ is the number of pixels in this window.

Proof: Rewriting (3) using matrix notation we obtain $$J(\alpha, a, b) = \sum_k \left\| G_k \begin{bmatrix} a_k \\ b_k \end{bmatrix} - \bar{\alpha}_k \right\|^2 \quad (6)$$

where for every window $w_k$, $G_k$ is defined as a $(|w_k|+1) \times 2$ matrix. For each $i \in w_k$, $G_k$ contains a row of the form $[I_i, 1]$, and the last row of $G_k$ is of the form $[\sqrt{\varepsilon}, 0]$. For a given matte α we define $\alpha_k$ as a $(|w_k|+1) \times 1$ vector, whose entries are $\alpha_i$ for every $i \in w_k$, and whose last entry is 0. The elements in $\bar{\alpha}_k$ and $G_k$ are ordered correspondingly.

For a given matte α the optimal pair $a_k^*, b_k^*$ inside each window $w_k$ is the solution to the least squares problem:

$$(a_k^*, b_k^*) = \operatorname{argmin} \left\| G_k \begin{bmatrix} a_k \\ b_k \end{bmatrix} - \bar{\alpha}_k \right\| \quad (7)$$

$$(a_k^*, b_k^*) = (G_k^T G_k)^{-1} G_k^T \bar{\alpha}_k \quad (8)$$

Substituting this solution into (6) and denoting $\bar{G}_k = I - G_k(G_k^T G_k)^{-1} G_k^T$ we obtain $$J(\alpha) = \sum_k \bar{\alpha}_k^T \bar{G}_k^T \bar{G}_k \bar{\alpha}_k$$

and some further algebraic manipulations show that the (i, j)-th element of $\bar{G}_k^T \bar{G}_k$ may be expressed as:

$$\delta_{ij} - \frac{1}{|w_k|}\left(1 + \frac{1}{\frac{\varepsilon}{|w_k|}+\sigma_k^2}(I_i - \mu_k)(I_j - \mu_k)\right)$$

Summing over k yields the expression in (5).

Color Images

A simple way to apply the cost function to color images is to apply the gray level cost to each channel separately. Alternatively we can replace the linear model (2), with a 4D linear model:

$$\alpha_i \approx \sum_c a^c I_i^c + b, \forall i \in w, \quad (9)$$

The advantage of this combined linear model is that it relaxes our previous assumption that F and B are constant over each window. Instead, as we show below, it is enough to assume that in a small window each of F and B is a linear mixture of two colors; in other words, the values $F_i$ in a small window lie on a single line in the RGB color space: $F_i = \beta_i F_1 + (1-\beta_i)F_2$, and the same is true for the background values $B_i$. In what follows we refer to this assumption as the color line model.

Such a model is useful since it captures, for example, the varying shading on a surface with a constant albedo (this being a property of an object that determines how much light it reflects). Another example is a situation where the window contains an edge between two uniformly colored regions both belonging to the background or the foreground. Furthermore, Omer and Werman [10] demonstrated that in many natural images the pixel colors in RGB space tend to form a relatively small number of elongated clusters. Although these clusters are not straight lines, their skeletons are roughly linear locally.

Theorem 2 If the foreground and background colors in a window satisfy the color line model we can express $$\alpha_i \approx \sum_c a^c I_i^c + b, \forall\, i \in w,$$

Substituting into (1) the linear combinations $F_i = \beta_i^F F_1 + (1-\beta_i^F)F_2$ and $B_i = \beta_i^B B_1 + (1-\beta_i^B)B_2$, where $F_1$, $F_2$, $B_1$, $B_2$ are constant over a small window, we obtain:

$$I_i^c = \alpha_i(\beta_i^F F_1^c + (1-\beta_i^F)F_2^c) + (1-\alpha_i)(\beta_i^B B_1^c + (1-\beta_i^B)B_2^c)$$

Let H be a 3×3 matrix whose c-th row is $\lfloor F_2^c + B_2^c, F_1^c - F_2^c, B_1^c - B_2^c \rfloor$. Then the above may be rewritten as:

$$H \begin{bmatrix} \alpha_i \\ \alpha_i \beta_i^F \\ (1-\alpha_i)\beta_i^B \end{bmatrix} = I_i - B_2$$

where $I_i$ and $B_2$ are 3×1 vectors representing 3 color channels. We denote by $\alpha^1, \alpha^2, \alpha^3$ the elements in the first row of $H^{-1}$, and by b the scalar product of first row of $H^{-1}$ with the vector $B_2$. We then obtain $$\alpha_i = \sum_c a^c I_i + b.$$

Using the 4D linear model (9) we define the following cost function for matting of RGB images:

$$J(\alpha, a, b) = \sum_{j \in I}\left(\sum_{i \in w_j}\left(\alpha_i - \sum_c a_c^j I_i^c - b_j\right)^2 + \varepsilon \sum_c a_j^{c^2}\right) \quad (10)$$

Similarly to the grayscale case, $\alpha^c$ and b can be eliminated from the cost function, yielding a quadratic cost in the $\alpha$ unknowns alone:

$$J(\alpha) = \alpha^T L \alpha \quad (11)$$

Here L is an N×N matrix, whose (i,j)-th element is:

$$\sum_{k|(i,j)\in w_k}\left(\delta_{ij} - \frac{1}{|w_k|}\left(1 + (I_i - \mu_k)\left(\sum_k + \frac{\varepsilon}{|w_k|}I_3\right)^{-1}(I_j - \mu_k)\right)\right) \quad (12)$$

where $$\sum_k$$

is a 3×3 covariance matrix, $\mu_k$ is a 3×1 mean vector of the colors in a window $w_k$ and $I_3$ is the a 3×3 identity matrix.

We refer to the matrix L in equations (5) and (12) as the matting Laplacian. Note that the elements in each row of L sum to zero, and therefore the nullspace of L includes the constant vector. If $\epsilon = 0$ is used, the nullspace of L also includes every color channel of I.

EXAMPLES

In all examples presented in this section the scribbles used in our algorithm are presented in the following format: black and white scribbles are used to indicate the first type of hard constraints on a. Gray scribbles are used to present the third constraints class—requiring α and b to be constant (without specifying their exact value) within the scribbled area. Finally, red scribbles represent places in which foreground and background colors where explicitly specified.

Figure 3:
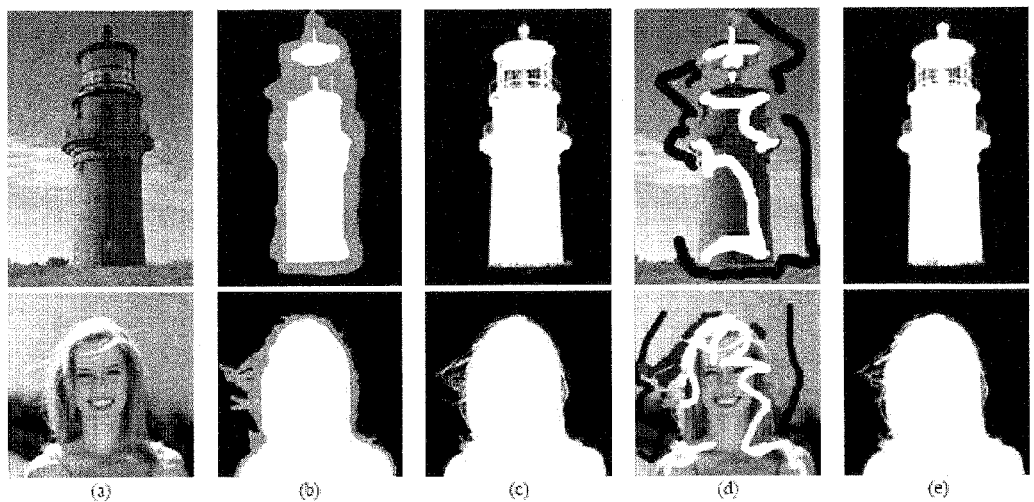
FIG. 3 shows pictorially results for Bayesian matting examples. (a) input image; (b) is a prior art trimap; (c) shows Bayesian matting results; (d) and (e) show respectively scribbles and results according to the invention.

FIG. 3 presents matting results on images from the Bayesian matting paper [5]. The results are compared with the results published on their webpage. The results are compatible. While the Bayesian matting results use a trimap, our results were obtained using sparse scribbles.

Figure 4:
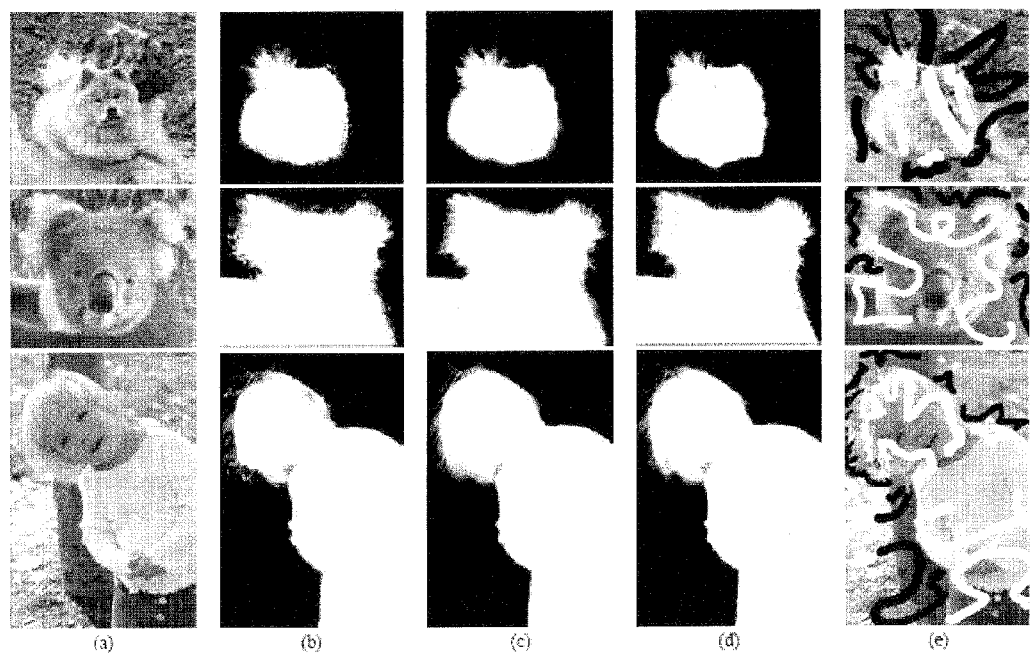
FIG. 4 shows pictorially results for Poission matting examples; (a) is an input image; (b) shows Bayesian matting; (c) Poisson matting; (d) and (e) show respectively results and scribbles according to the invention.

In FIG. 4 we extract mattes from a few of the more challenging examples presented in the Poisson matting paper [9]. For comparison, the Poisson and Bayesian matting results as calculated in [9] are also shown. In the first two examples our results were obtained using only rough black and white scribbles. In the third example, which is a much harder one, we have obtained a high quality matte, but extracting every single hair from the complex textured background required accurate black scribbles to be specified. This image seems to be more difficult for other matting algorithms as well [9].

Figure 5:
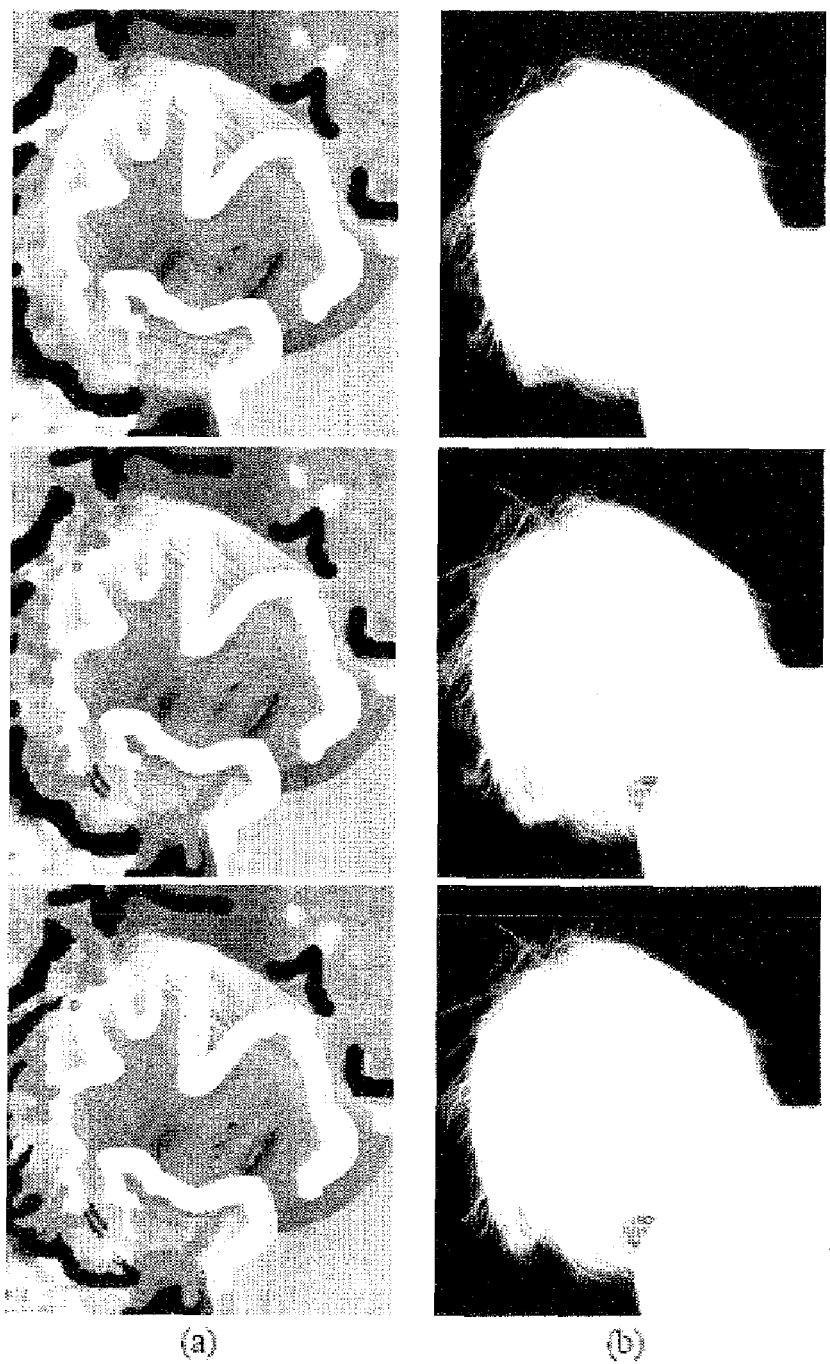
FIG. 5 shows pictorially progressive matting extraction. By evaluating the matting result in a given stage. scribbles can be add where further refinement is desired. (a) input scribbles (b) resulted a-matte.

The amount of scribbles required depends not only on the complexity of the input image but also on the required accuracy in the results. In fact, for the complicated image in the bottom of FIG. 4, quite good results can be obtained with much coarser scribbles as shown in FIG. 5. This suggest a progressive process, in which the artist starts with initial scribbles, evaluates the resulting matte and adds scribbles where the matting needs improvement. FIG. 5 demonstrates the matting refinement process.

Figure 6:
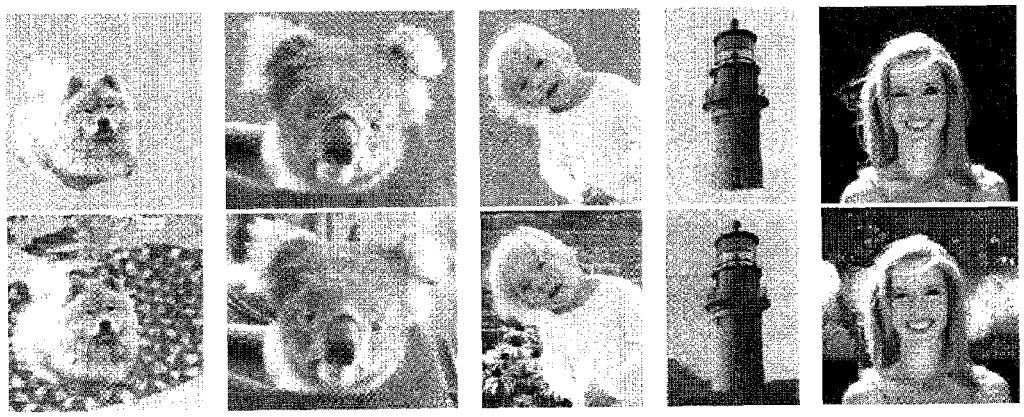
FIG. 6 shows pictorially composition examples from the images in FIGS. 3 and 4: Top row: compositing with a constant background. Bottom row: natural images compositing.

FIG. 6 presents compositing examples using our algorithm for the images in FIGS. 3, 4 both on a constant background and with natural images.

Figure 7:
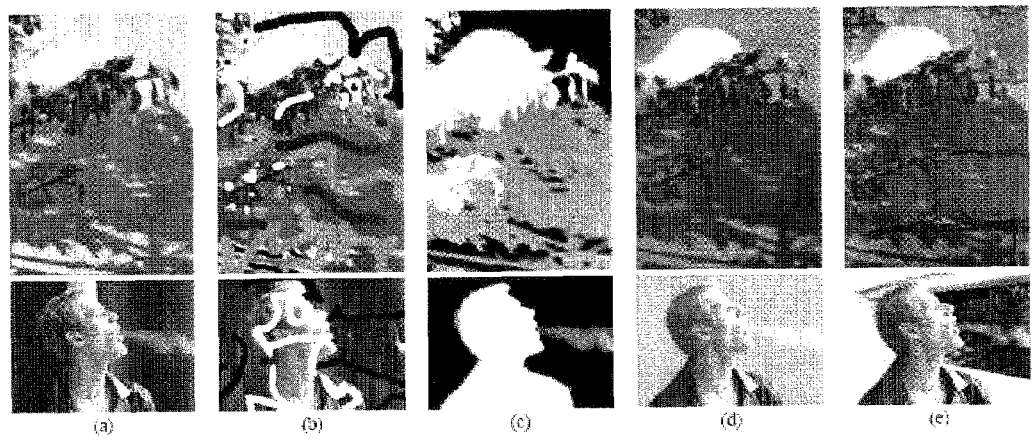
FIG. 7 shows additional examples of the invention applied for shadow and smoke extraction. (a) input image (b) scribbles (c) extracted matting; (d) and (e) compositions.

FIG. 7 presents additional applications of our technique. In particular, the red scribbles specifying the foreground and background color, can be used to extract shadow and smoke. In the top figure, the red scribble on the shadow specifies that the foreground color is black. In the bottom figure, the red scribble on the smoke indicates the foreground color is white (in both cases the background color in the red scribbles was copied from neighboring, uncovered pixels). These sparse constraints on the awere then propagated to achieve the final matte. Note that shadow matting cannot be directly achieved with matting algorithms which initialize foreground colors using neighboring pixels, since no neighboring black pixels are present. Note also that the shadow area captures a significant amount of the image area and it is not clear how to specify a good trimap in this case. The smoke example was processed also in [4], but in their case a background model was calculated using multiple frames.

Constraints and User Interface

In our system the user-supplied constraints on the matte are provided via a scribble-based GUI. The user uses a background brush (black scribbles in our examples) to indicate background pixels ($\alpha=0$) and a foreground brush (white scribbles) to indicate foreground pixels ($\alpha=1$).

A third type of brush (red scribbles) is sometimes used to constrain certain mixed pixels to a specific desired opacity value $\alpha$. The user specifies this value implicitly by indicating the foreground and background colors F and B (for example, by copying these colors from other pixels in the image). The value of $\alpha$ is then computed using (1).

Another kind of brush (gray scribbles) may sometimes be used to indicate that F and B satisfy the color line model for all of the pixels covered by the scribble. Rather than adding an additional constraint on the value of $\alpha$, our system responds to such scribbles by adding an additional window $w_k$ in (12) containing all of the pixels covered by the scribble (in addition to the standard 3×3 windows).

To extract an alpha matte matching the user's scribbles we solve for $$\alpha = \arg\min \alpha^T L \alpha \, s.t. \, \alpha_i = s_i, \, \forall i \in S \quad (13)$$

where S is the group of scribbled pixels and $s_i$ is the value indicated by the scribble.

Theorem 3 Let I be an image formed from F and B according to (1), and let $\alpha^*$ denote the true alpha matte. If F and B satisfy the color line model in every local window $w_k$, and if the user-specified constraints S re consistent with $\alpha^*$, then $\alpha^*$ is an optimal solution for the system (13), where L is constructed with $\epsilon=0$.

Since $\epsilon=0$, if the color line model is satisfied in every window $w_k$, it follows from the definition (10) that $J(\alpha^*, a, b)=0$, and therefore $J(a^*)=\alpha^{*T}L\alpha^*=0$.

Figure 8:
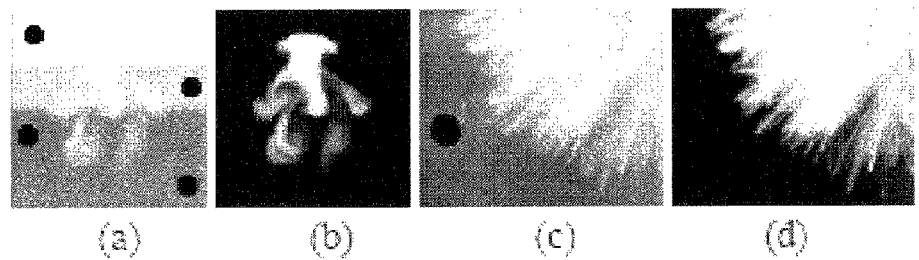
FIGS. 8(a) and 8(c) show pictorially input images with scribbles.
FIGS. 8(b) and 8(d) show pictorially extracted mattes derived according to the invention from the input images shown in FIGS. 8(a) and 8(c), respectively.

We demonstrate this in FIG. 8. The first image (FIG. 8(a)) is a synthetic example that was created by compositing computer-simulated (monochromatic) smoke over a simple background with several color bands, which satisfies the color line model. The black and white scribbles show the input constraints. The matte extracted by our method (FIG. 8(b)) is indeed identical to the ground truth matte. The second example (FIG. 8(c)) is a real image, with fairly uniform foreground and background colors. By scribbling only two black and white points, a high quality matte was extracted (FIG. 8(d)).

Spectral Analysis

The matting Laplacian matrix L is a symmetric positive definite matrix, as evident -from theorem 1 and its proof. This matrix may also be written as L=D−W, where D is a diagonal matrix $$D(i, i) = \sum_i W(i, j)$$

and W is a symmetric matrix, whose off-diagonal entries are defined by (12). Thus, the matrix L is the graph Laplacian used in spectral methods for segmentation, but with a novel affinity function given by (12). For comparison, the typical way to define the affinity function (e.g., in normalized cuts image segmentation algorithms [13]) is to set $$W_G(i,j) = e^{-(\|I_i - I_j\|^2 / \sigma^2)} \quad (14)$$

where $\sigma$ is a global constant (typically chosen by hand). This affinity is large for nearby pixels with similar colors and approaches zero when the color difference is much greater than $\sigma$. The random walk matting algorithm [6] has used a similar affinity function for the matting problem, but the color distance between two pixels was taken after applying a linear transformation to their colors. The transformation is image-dependent and is estimated using a manifold learning technique.

In contrast, by rewriting the matting Laplacian as L=D−W we obtain the following affinity function, which we refer to as "the matting affinity":

$$W_{M(i,j)} = \sum_{k|(i,j)\in w_k} \left( \frac{1}{|w_k|} \left( 1 + (I_i - \mu_k) \left( \sum_k + \frac{\varepsilon}{|w_k|} I_3 \right)^{-1} (I_j - \mu_k) \right) \right) \quad (15)$$

To gain intuition regarding the matting affinity, consider an image patch containing exactly two colors (e.g., an ideal edge). In this case, it can be shown (see [8] for a proof) that the affinity between two pixels of the same color decreases with distance, while the affinity between pixels of different colors is zero. In general, we obtain a similar situation to that of standard affinity functions: nearby pixels with similar colors have high affinity, while nearby pixels with different colors have small affinity. However, note that the matting affinity does not have a global scaling parameter $\sigma$ and rather uses local estimates of means and variances. As we show subsequently, this adaptive property leads to a significant improvement in performance. A similar observation was also made in [16], which suggests that local adaptation of the scaling parameter improves image segmentation results.

To compare the two affinity functions we examine the smallest eigenvectors of the corresponding Laplacians, since these eigenvectors are used by spectral segmentation algorithms for partitioning images.

To segment an image using the normalized cuts framework [13] one looks at the smallest eigenvectors of the graph Laplacian. These eigenvectors tend to be piecewise constant in uniform image areas and have transitions between smooth areas mainly where edges in the input images exist. The values of the eigenvectors are used in order to cluster the pixels in the image into coherent segments.

Figure 9:
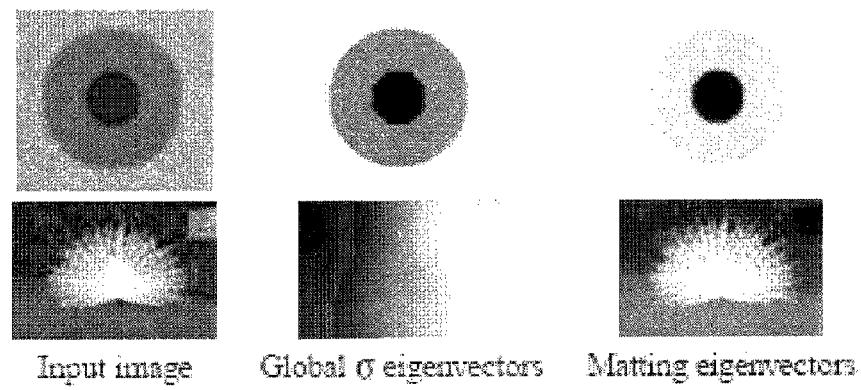
FIG. 9 show pictorially prior art global sigma eigenvectors compared with matting eigenvectors according to the invention derived from a common input image.

Similarly to the eigenvectors of the normalized cuts Laplacian, the eigenvectors of the matting Laplacian also tend to be piecewise constant and may be used to cluster pixels into segments. However, the eigenvectors of the matting Laplacian also capture fuzzy transitions between segments. In the case of complex and fuzzy boundaries between regions, this can be critical. To demonstrate the difference between the two Laplacians, FIG. 9 shows the second smallest eigenvector (the first smallest eigenvector is the constant image in both cases) for both Laplacian matrices on two example images. The first example is a simple image with concentric circles of different color. In this case the boundaries between regions are very simple, and both Laplacians capture the transitions correctly. The second example is an image of a peacock. The global $\sigma$ eigenvector (used by the normalized-cuts algorithm) fails to capture the complex fuzzy boundaries between the peacock's tail feathers and the background. In contrast, the matting Laplacian's eigenvector separates the peacock from the background very well. The matting Laplacian in this case was computed with $\epsilon=0.0001$.

The Eigenvectors as Guides

While the matting problem is ill-posed without some user input, the matting Laplacian matrix contains a lot of information on the image even before any scribbles have been provided, as demonstrated in the previous section.

This suggests that looking at the smallest eigenvectors of the matting Laplacian can guide the user where to place scribbles. For example, the extracted matte tends to be piecewise constant in the same regions where the smallest eigenvectors are piecewise constant. If the values inside a segment in the eigenvector image are coherent, a single scribble within such a segment should suffice to propagate the desired value to the entire segment. On the other hand, areas where the eigenvector's values are less coherent correspond to more "difficult" regions in the image, suggesting that more scribbling efforts might be required there.

Stated somewhat more precisely, the alpha matte can be predicted by examining the smaller eigenvectors of the matting Laplacian, since an optimal solution to the matting problem prefers to place more weight on the smaller eigenvectors than it places on the larger ones. As a result, a dominant part of the matte tends to be spanned by the smaller eigenvalues.

Figure 10:
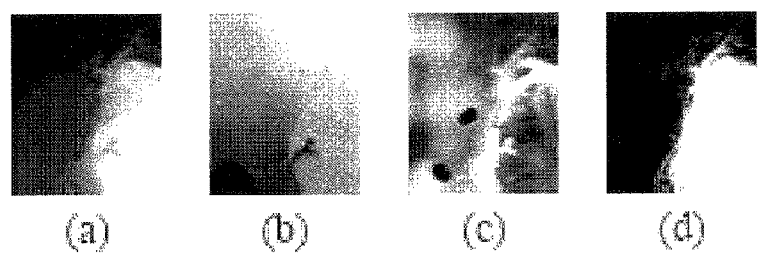
FIGS. 10(a) and 10(b) shows the smallest eigenvectors used for guiding scribble placement shown in FIG. 10(c) to produce the matter shown in FIG. 10(d)

FIG. 10 illustrates how a scribbling process may be guided by the eigenvectors. By examining the two smallest eigenvectors (FIG. 10(a-b)) we placed a scribble inside each region exhibiting coherent eigenvector values (FIG. 10(c)). The resulting matte is shown in FIG. 10(d). Note that the scribbles in FIG. 10(c) were our first, and single attempt to place scribbles on this image.

The resulting matte can be further improved by some more scribbling (especially in the hair area).

We show here results of our closed form solution for extracting alpha mattes by minimizing the matting Laplacian subject to the scribbled constraints. Since the matting Laplacian is quadratic in alpha, the minimum can be found exactly by solving a sparse set of linear equations. We usually define the matting Laplacian using 3×3 windows. When the foreground and background color distributions are not very complex using wider windows is helpful. However, using wider windows increases computation time since the resulting system is less sparse. To overcome this, we consider the linear coefficients (eq. 9) that relate an alpha matte to an image. The coefficients obtained using wide windows on a fine resolution image are similar to those obtained with smaller windows on a coarser image. Therefore we can solve for the alpha matte using 3×3 windows on a coarse image and compute the linear coefficients which relate it to the coarse image. We then interpolate the linear coefficients and apply them on a finer resolution image. The alpha matte obtained using this approach is similar to the one that would have obtained by solving the matting system directly on the fine image with wider windows. More details are provided in [8].

For the results shown here we solve the matting system using Matlab's direct solver (the "backslash" operator) which takes 20 seconds for a 200 by 300 image on a 2.8 GHz CPU. Processing big images using the Matlab solver is impossible due to memory limitations. To overcome this we use a coarse-to-fine scheme. We downsample the image and the scribbles and solve in a lower resolution. The reconstructed alpha is then interpolated to the finer resolution, alpha values are thresholded and pixels with alpha close to 0 or 1 are considered constraints in the finer resolution. Constraint pixels can be eliminated from the system, reducing the system size. We have also implemented a multigrid solver for matte extraction. The multigrid solver runs in a couple of seconds even for very large images, but with a small degradation in matte quality.

We show here only the extracted alpha mattes. Note that for compositing on a novel background, we also need to solve for F. After the matte has been found, it is possible to solve for the and coefficients directly from equation (10) and extract the foreground and background from them. However, we have found that better estimations of foreground and background are obtained by solving a new set of linear equations in F and B, derived by introducing some explicit smoothness priors on F and B into equation (1). More information on the foreground reconstruction as well as some compositing results can be found in [8].

Figure 11:
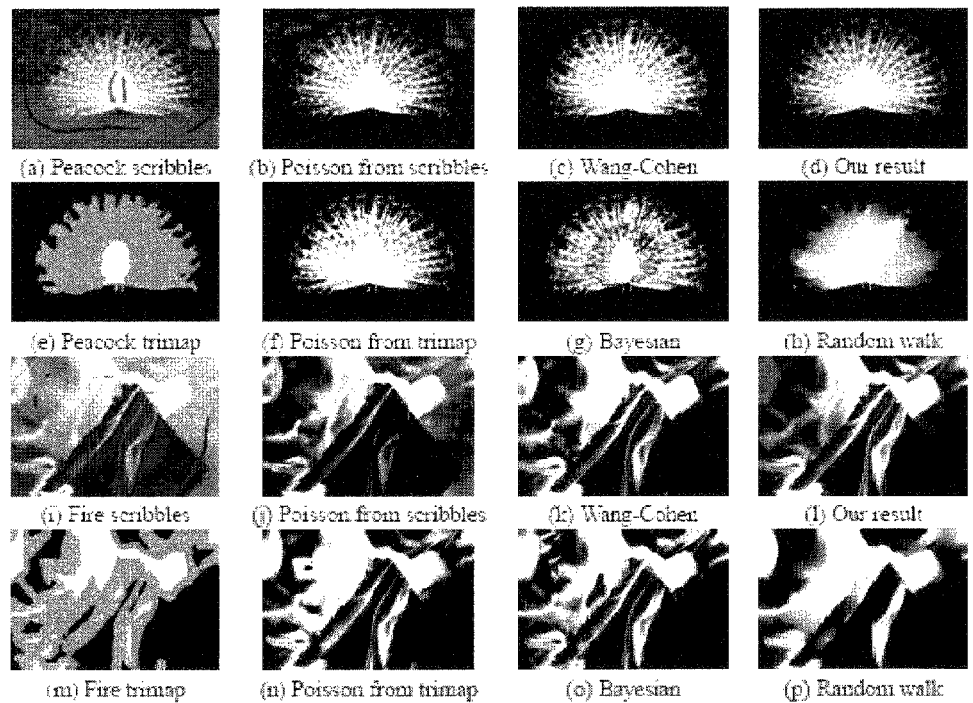
FIGS. 11(a),(c),(e),(g),(i),(k),(m) and (o) show pictorially alpha mattes extracted by different prior art algorithms.
FIGS. 11(b),(d),(f),(h),(j),(l) and (n) show pictorially alpha mattes generated by implementing the respective methods in accordance with the invention.

FIG. 11 shows the mattes extracted using our technique on two challenging images used in [15] and compares our results to several other recent algorithms. It can be seen that our results on these examples are comparable in quality to those of [15], even though we use a far simpler algorithm. Global Poisson matting cannot extract a good matte from sparse "scribbles" although its performance with a trimap is quite good. The random walk matting algorithm [6] also minimizes a Laplacian but uses an affinity function with a global scaling parameter and hence has a particular difficulty with the peacock image.

Figure 12:
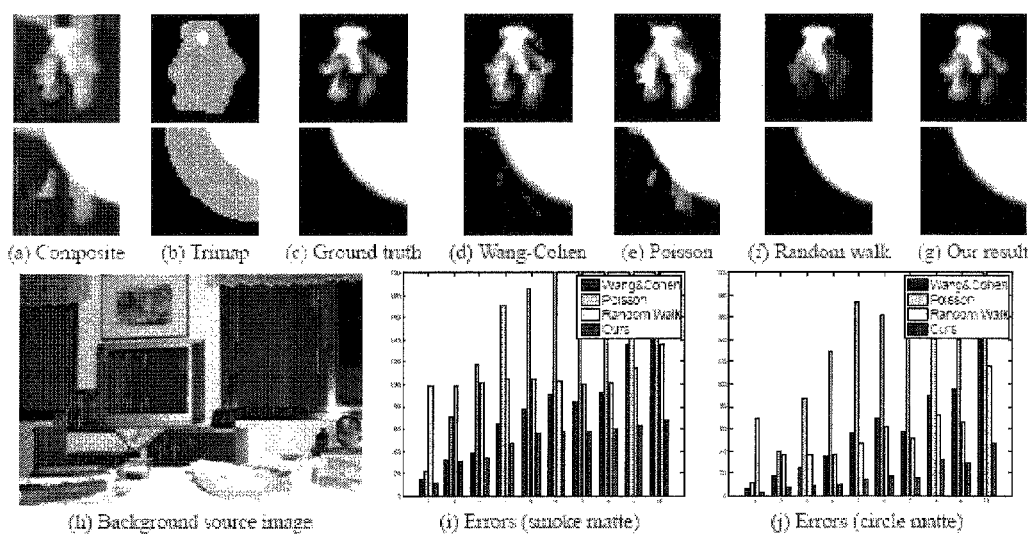
FIG. 12 shows a quantitative comparison using two ground truth mattes produced using known methods modified in accordance with the invention.

To obtain a more quantitative comparison between the algorithms, we performed an experiment with synthetic composites for which we have the ground truth alpha matte. We randomly extracted 2000 subimages from the image shown in FIG. 12(h). We used each subimage as a background and composited over it a uniform foreground image using two different alpha mattes: the first matte is the computer simulated smoke most of which is partially transparent; the other matte is a part of a circle, mostly opaque with a feathered boundary. The mattes are shown in FIG. 12(c). Consequently, we obtained 4000 composite images, two of which are shown in FIG. 12(a).) On this set of images we compared the performance of four matting algorithms—Wang and Cohen, global Poisson matting, random walk matting, and our own (using 3×3 windows with no pyramid). All algorithms were provided a trimap as input. Examples of the trimaps and the results produced by the different methods are shown in FIGS. 12(a,d-g)). For each algorithm, we measured the summed absolute error between the extracted matte and the ground truth. FIGS. 12(i, j) plot the average error of the four algorithms as a function of the smoothness of the background (specifically we measured the average gradient strength, binned into 10 bins). The errors in the smoke matte are plotted in FIG. 12(i), while errors in the circle matte are plotted in FIG. 12(j). When the background is smooth, all algorithms perform well with both mattes. When the background contains strong gradients, global Poisson matting performs poorly (recall that it assumes that background and foreground gradients are negligible). Of the remaining algorithms, our algorithm consistently produced the most accurate results.

Figure 13:
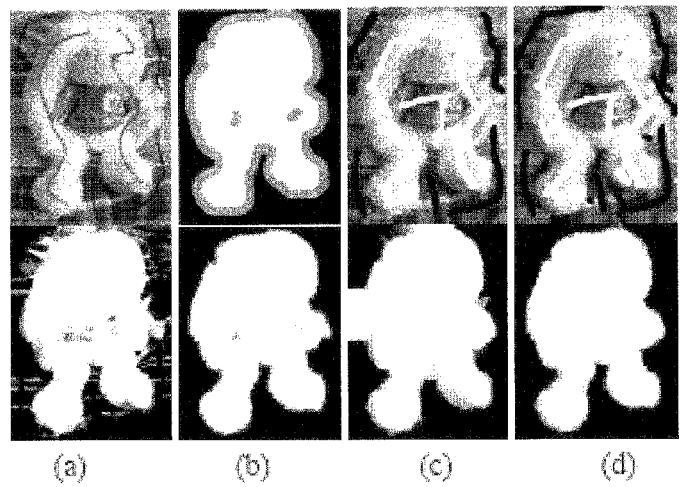
FIG. 13(a) shows prior art scribbles and matte.
FIG. 13(b) shows color ambiguity between foreground and background using a prior art trimap.
FIG. 13(c) shows color ambiguity between foreground and background using scribbles according to the invention similar to those in FIG. 13(a)
FIG. 13(d) shows color ambiguity between foreground and background using a few additional scribbles according to the invention.

FIG. 13 shows an example (from [15]), where Wang and Cohen's method fails to extract a good matte from scribbles due to color ambiguity between the foreground and the background. The same method, however, is able to produce an acceptable matte when supplied with a trimap. Our method produces a cleaner, but also not perfect matte from the same set of scribbles, but adding a small number of additional scribbles results in a better matte.

Figure 14:
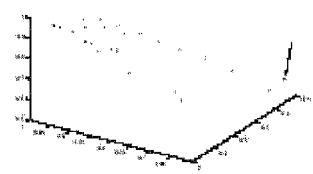
FIG. 14 shows an example with ambiguity between F and B.

FIG. 14 shows another example (a closeup of the Koala image from [14]), where there's an ambiguity between foreground and background colors. In this case the matte produced by our method is clearly better than the one produced by the Wang-Cohen method. To better understand why this is the case, we show an RGB histogram of representative pixels from the F and B scribbles. Some pixels in the background fit the foreground color model much better then the background one (one such pixel is marked red in FIG. 14(b) and indicated by an arrow in FIG. 14(d)). As a result such pixels are classified as foreground with a high degree of certainty in the first stage. Once this error has been made it only reinforces further erroneous decisions in the vicinity of that pixel, resulting in a white clump in the alpha matte.

Figure 15:
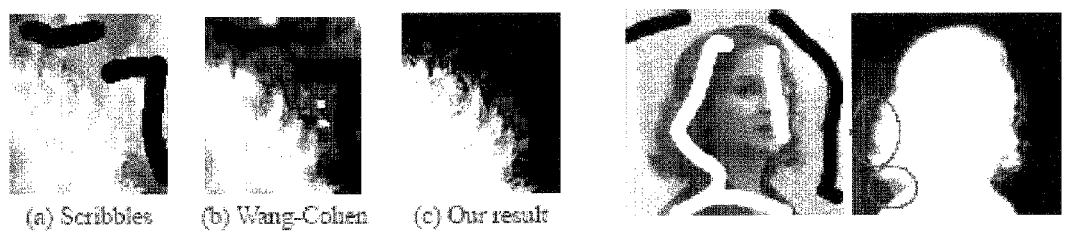
FIG. 15 shows failure owing to lack of a color model.

Since our method does not make use of global color models for F and B it can handle ambiguous situations such as that in FIG. 14. However, there are also cases where our method fails to produce an accurate matte for the very same reason. FIG. 15 shows an actress in front of a background with two colors. Even though the black B scribbles cover both colors the generated matte includes parts of the background (between the hair and the shoulder on the left). In such cases, the user would have to add another B scribble in that area.

As mentioned above, our framework applies for video matting as well. In video, window neighborhoods are defined in the 3D volume, and therefore constraints scribbled on selected frames are propagated in time to the rest of the sequence, in the same way that they are propagated in space. We have tested our algorithm on the 'Amira sequence' from Chuang et al. 2002 [4]. We placed scribbles on 7 out of 76 frames. For comparison, in [4], a trimap was drawn over 11 out of 90 frames, and the interpolated trimap was refined in 2 additional frames. The sequence was captured from the avi file available on the video matting web page and was downsampled to avoid compression artifacts.

The scribble interface can also be useful in matting problems where the background is known (or estimated separately). This is particularly useful in the processing of video, where often it is possible to obtain a good estimate of the background but obtaining a good matte from this background model is challenging. To illustrate this use, we ran a modified version of our algorithm on the 'Kim' sequence from [4]. We first used the background model computed by [4] and automatically used this model to generate constraints by thresholding the difference between any pixel and the background model. This is similar to way in which [1] automatically generated a trimap. When we used our algorithm to propagate these constraints we obtained a matting that was fine in most places, but had noticeable artifacts in the mixed pixels around the top of the head. We then added additional red scribbles specifying that the foreground color is blond for the top 20 pixels in all frames. Using this additional user input, we were able to fix these artifacts. Results are shown in the supplementary material. For comparison, in addition to using the background model, [4] specified a trimap at about 11 key frames out of 101, and refined the interpolated trimap in another 4 frames.

Figure 16:
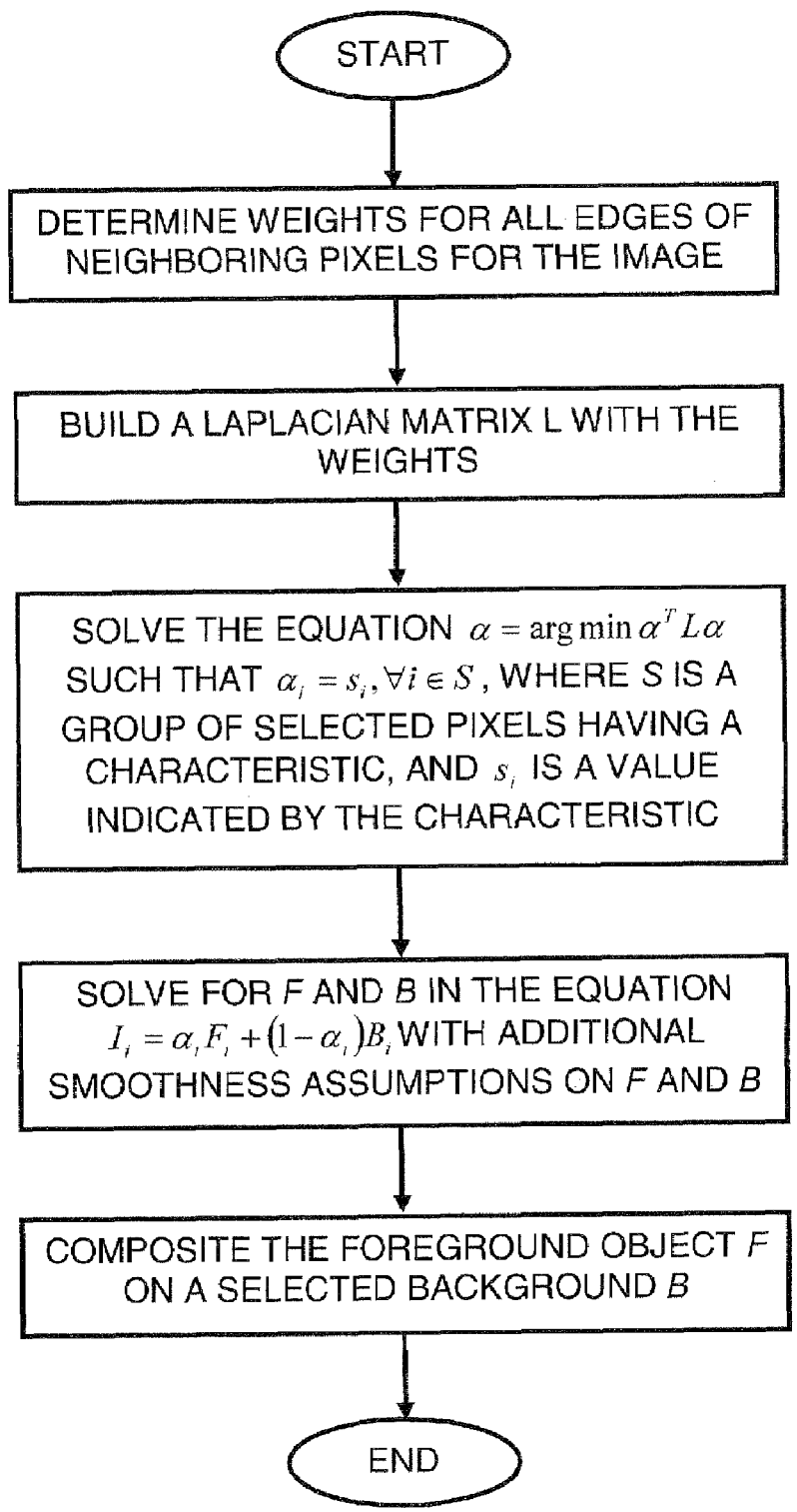
FIG. 16 is a flow diagram showing the principal operations carried out by a method according to an embodiment of the invention for matting a foreground object F having an opacity α constrained by associating a characteristic with selected pixels in an image having a background B.

FIG. 16 is a flow diagram showing the principal operations carried out by a method according to an embodiment of the invention for matting a foreground object F having an opacity α constrained by associating a characteristic with selected pixels in an image having a background B. Weights are determined for all edges of neighboring pixels for the image and used to build a Laplacian matrix L. The equation α is solved where $\alpha = \arg\min \alpha^T L\alpha$ s.t. $\alpha_i = s_i$, $\forall i \in S$, S is the group of selected pixels, and $s_i$ is the value indicated by the associated characteristic. The equation $I_i = \alpha_i F_i + (1-\alpha_i) B_i$ is solved for F and B with additional smoothness assumptions on F and B; after which the foreground object F may be composited on a selected background B'. The selected background B' may be the original background B or may be a different background, thus allowing foreground features to be extracted from the original image and copied to a different background.

Figure 17:
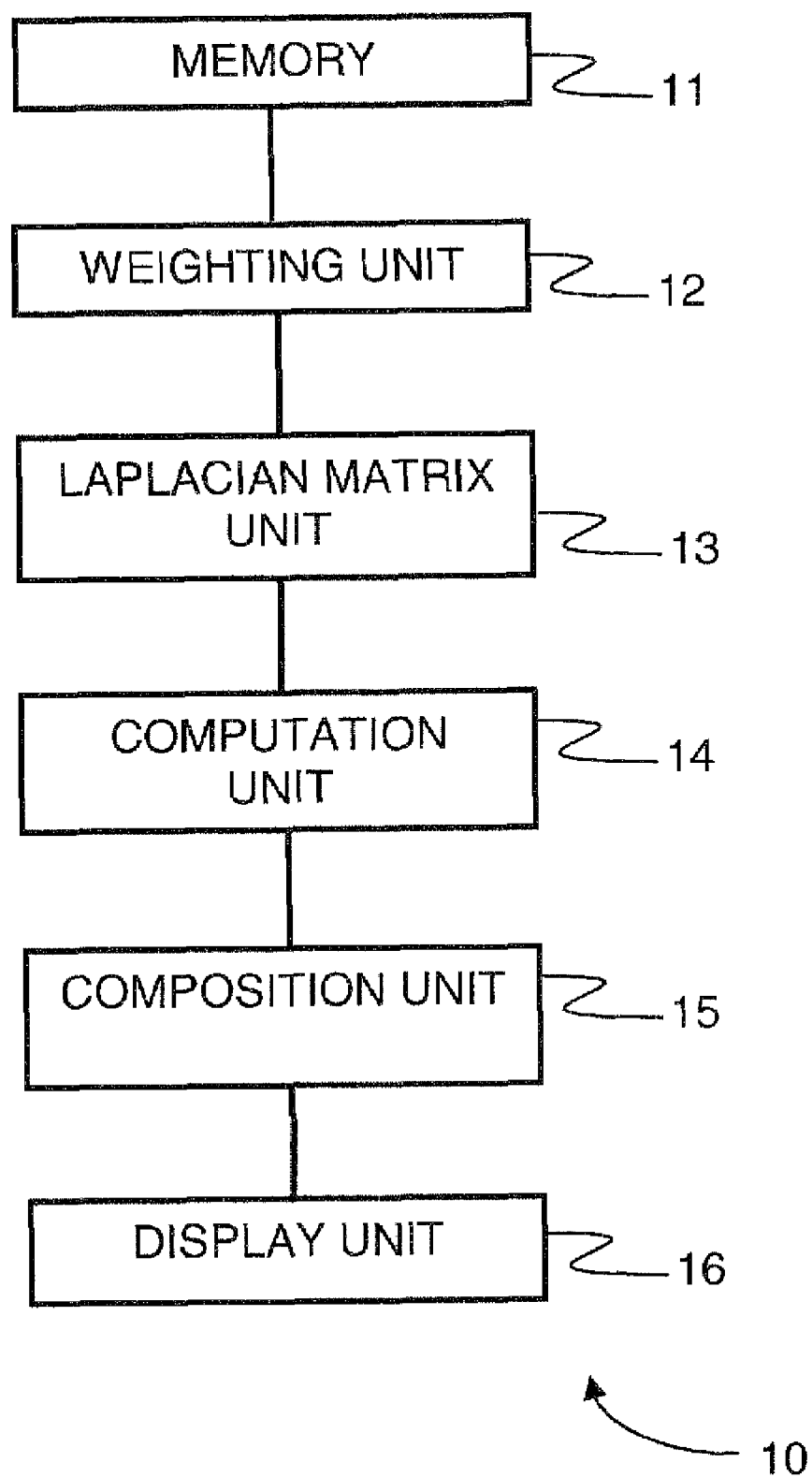
FIG. 17 is a block diagram showing functionality of a system according to an embodiment of the invention for matting a foreground object F having an opacity α constrained by associating a characteristic with selected pixels in an image having a background B.

FIG. 17 is a block diagram showing functionality of a system 10 according to an embodiment of the invention for matting a foreground object F having an opacity α constrained by associating a characteristic with selected pixels in an image having α background B. The system 10 includes a memory 11, and a weighting unit 12 coupled to the memory for determining weights for all edges of neighboring pixels for the image. A Laplacian matrix unit 13 is coupled to the weighting unit 12 for build a Laplacian matrix L with the weights; and a computation unit 14 is coupled to the Laplacian matrix unit 13 for solving the equation α where $\alpha = \arg\min \alpha^T L\alpha$ s.t. $\alpha_i = s_i$, $\forall i \in S$, S is the group of selected pixels, and $s_i$ is the value indicated by the characteristic. A composition unit 15 is coupled to the computation unit 14 for compositing the foreground object F as computed by the computation unit 14 on a selected background B' for display by a display unit 16 coupled to the composition unit 15. The selected background B' may be the original background B or may be a different background, thus allowing foreground features to be extracted from the original image and copied to a different background.

DISCUSSION

Matting and compositing are tasks of central importance in image and video editing and pose a significant challenge for computer vision. While this process by definition requires user interaction, the performance of most existing algorithms deteriorates rapidly as the amount of user input decreases. The invention introduces a cost function based on the assumption that foreground and background colors vary smoothly and showed how to analytically eliminate the foreground and background colors to obtain a quadratic cost function in alpha. The resulting cost function is similar to cost functions obtained in spectral methods to image segmentation but with a novel affinity function that is derived from the formulation of the matting problem. The global minimum of our cost can be found efficiently by solving a sparse set of linear equations. Our experiments on real and synthetic images show that our algorithm clearly outperforms other algorithms that use quadratic cost functions which are not derived from the matting equations. Our experiments also demonstrate that our results are competitive with those obtained by much more complicated, nonlinear, cost functions. However, compared to previous nonlinear approaches, we can obtain solutions in a few seconds, and we can analytically prove properties of our solution and provide guidance to the user by analyzing the eigenvectors of our operator.

While our approach assumes smoothness in foreground and background colors, it does not assume a global color distribution for each segment. Our experiments have demonstrated that our local smoothness assumption often holds for natural images. Nevertheless, it would be interesting to extend our formulation to include additional assumptions on the two segments (e.g., global models, local texture models, etc.). The goal is to incorporate more sophisticated models of foreground and background but still obtain high quality results using simple numerical linear algebra.

It will also be understood that the system according to the invention may be a suitably programmed computer. Likewise, the invention contemplates a computer program being readable by a computer for executing the method of the invention. The invention further contemplates a machine-readable memory tangibly embodying a program of instructions executable by the machine for executing the method of the invention.

What is claimed is:

1. A method for matting, with a processing unit, a foreground object F having an opacity $\alpha$ in an image having a background B, the respective opacity of selected pixels in the foreground object F and the background B being constrained by associating a characteristic with said pixels, the method comprising:

(a) dividing, with the processing unit, the image into small windows, w;
    (b) determining, with the processing unit, weights for all edges of neighboring pixels for the image in said windows;
    (c) assuming, with the processing unit, within each window w, that $\alpha$ is a linear combination of color channels, c, $$\alpha_i \approx \sum_c a^c I_i^c + b, \forall\, i \in w,$$

(d) using, with the processing unit, a cost function $$J(\alpha, a, b) = \sum_{j \in I} \left( \sum_{i \in w_j} \left( \alpha_i - \sum_c a_c^j I_i^c - b_j \right)^2 + \varepsilon \sum_c a_j^{c2} \right)$$

eliminate a, b to obtain a cost function involving only $\alpha$ of the form $J(\alpha) = \alpha^T L \alpha$ where $L(i,j)$ is of the form:

$$\sum_{k|(i,j)\in w_k} \left( \delta_{ij} - \frac{1}{|w_k|} \left( 1 + (I_i - \mu_k) \left( \sum_k + \frac{\varepsilon}{|w_k|} I_3 \right)^{-1} (I_j - \mu_k) \right) \right)$$

where $\delta_{ij}$ is the Kronecker delta, $\mu_k$ and $\sigma_k^2$ are the mean and covariance of the intensities in the window $w_k$ around k and $|w_k|$ is the number of pixels in this window;
    (e) solve, with the processing unit, for $\alpha$ where $\alpha = \arg\min \alpha^T L \alpha$ s.t. $\alpha_i = s_i$, $\forall i \in S$, S is the group of selected pixels, and $s_i$ is the value indicated by said characteristic;
    (f) solve, with the processing unit, for F and B in the equation $I_i = \alpha_i F_i + (1-\alpha_i) B_i$ with additional smoothness assumptions on F and B;
    (g) compositing, with the processing unit the foreground object F on a selected background B' so as to generate an image; and
    (h) storing data representative of the image in memory for subsequent display.

2. The method according to claim 1, wherein the characteristic with said pixels is a respective distinctive color.

3. The method according to claim 2, wherein areas of F and B are each identified by a scribble of a respective distinctive color.

4. The method according to claim 2, wherein only two distinctive colors are used to constrain the opacity $\alpha$ to be 0 or 1.

5. The method according to claim 2, wherein additional colors are used to identify F and B respectively so as to constrain the value of $\alpha$.

6. The method according to claim 3, wherein the respective values of $\alpha$ in F and B are constrained to be constant but unknown within a scribble.

7. The method according to claim 1, wherein the selected background B' is different from the background B.

8. The method according to claim 1, wherein the input is a video sequence and the foreground F, background B and opacity $\alpha$ are also video sequences.

9. A system for matting a foreground object F having an opacity $\alpha$ in an image having a background B, the respective opacity of selected pixels in the foreground object F and the background B being constrained by associating a characteristic with said pixels, comprising:

a processing unit;
    a memory coupled to the processing unit for storing software executable on the processing unit, the software being operable to:
    (a) dividing the image into small windows, w;
    (b) determining weights for all edges of neighboring pixels for the image in said windows;
    (c) assuming within each window w, that $\alpha$ is a linear combination of color channels, c, $$\alpha_i \approx \sum_c a^c I_i^c + b, \forall\, i \in w,$$

(d) using a cost function $$J(\alpha, a, b) = \sum_{j \in I} \left( \sum_{i \in w_j} \left( \alpha_i - \sum_c a_c^j I_i^c - b_j \right)^2 + \varepsilon \sum_c a_j^{c2} \right)$$

eliminate a, b to obtain a cost function involving only $\alpha$ of the form $J(\alpha) = \alpha^T L \alpha$ where $L(i,j)$ is of the form:

$$\sum_{k|(i,j)\in w_k} \left( \delta_{ij} - \frac{1}{|w_k|} \left( 1 + (I_i - \mu_k) \left( \sum_k + \frac{\varepsilon}{|w_k|} I_3 \right)^{-1} (I_j - \mu_k) \right) \right)$$

where $\delta_{ij}$ is the Kronecker delta, $\mu_k$ and $\sigma_k^2$ are the mean and covariance of the intensities in the window $w_k$ around k and $|w_k|$ is the number of pixels in this window;
    (e) solve for $\alpha$ where $\alpha = \arg\min \alpha^T L \alpha$ s.t. $\alpha_i = s_i$, $\forall i \in S$, S is the group of selected pixels, and $s_i$ is the value indicated by said characteristic;
    (f) solve for F and B in the equation $I_i = \alpha_i F_i + (1-\alpha_i) B_i$ with additional smoothness assumptions on F and B;
    (i) compositing the foreground object F on a selected background B' so as to generate an image; and (g) storing data representative of the image in memory for subsequent display.

10. The system according to claim 9, wherein the characteristic with said pixels is a respective distinctive color.

11. The system according to claim 10, wherein areas of F and B are each identified by a scribble of a respective distinctive color.

12. The system according to claim 10, wherein only two distinctive colors are used to constrain the opacity α to be 0 or 1.

13. The system according to claim 10, wherein additional colors are used to identify F and B respectively so as to constrain the value of α.

14. The system according to claim 11, wherein the respective values of α in F and B are constrained to be constant but unknown within a scribble.

15. The system according to claim 9, wherein the selected background B' is different from the background B.

16. The system according to claim 9, wherein the input is a video sequence and the foreground F, background B and opacity α are also video sequences.

17. The system according to claim 9 further including a display device coupled to the memory for displaying said image.

18. A program storage device readable by machine, tangibly embodying a program of instructions executable by the machine to perform a method for matting a foreground object F having an opacity α in an image having a background B, the respective opacity of selected pixels in the foreground object F and the background B being constrained by associating a characteristic with said pixels, the method comprising:

(a) dividing the image into small windows, w;
(b) determining weights for all edges of neighboring pixels for the image in said windows;
(c) assuming within each window w, that α is a linear combination of color channels, c, $$\alpha_i \approx \sum_c a^c I_i^c + b, \forall i \in w,$$

(d) using a cost function $$J(\alpha, a, b) = \sum_{j \in I} \left( \sum_{i \in w_j} \left( \alpha_i - \sum_c a_c^j I_i^c - b_j \right)^2 + \varepsilon \sum_c a_j^{c2} \right)$$

eliminate a, b to obtain a cost function involving only α of the form $J(\alpha) = \alpha^T L\alpha$ where l,(i j) is of the form:

$$\sum_{k|(i,j) \in w_k} \left( \delta_{ij} - \frac{1}{|w_k|} \left( 1 + (I_i - \mu_k) \left( \sum_k + \frac{\varepsilon}{|w_k|} I_3 \right)^{-1} (I_j - \mu_k) \right) \right)$$

where $\delta_{ij}$ is the Kronecker delta, $\mu_k$ and $\sigma_k^2$ are the mean and covariance of the intensities in the window $w_k$ around k and $|w_k|$ is the number of pixels in this window;

(e) solve for α where $\alpha = \arg\min \alpha^T L\alpha$ s.t. $\alpha_i = s_i$, $\forall i \in S$, S is the group of selected pixels, and $s_i$ is the value indicated by said characteristic;

(f) solve for F and B in the equation $I_i = \alpha_i F_i + (1-\alpha_i)B_i$ with additional smoothness assumptions on F and B; and (g) compositing the foreground object F on a selected background B'.

* * * * *